L. M. G. DELAUNAY-BELLEVILLE.
POWER TRANSMISSION MECHANISM.
APPLICATION FILED MAR. 27, 1911.

1,026,498.

Patented May 14, 1912.

L. M. G. DELAUNAY-BELLEVILLE.
POWER TRANSMISSION MECHANISM.
APPLICATION FILED MAR. 27, 1911.

1,026,498.

Patented May 14, 1912.

2 SHEETS—SHEET 2.

UNITED STATES PATENT OFFICE.

LOUIS MARIE GABRIEL DELAUNAY-BELLEVILLE, OF ST.-DENIS, FRANCE, ASSIGNOR TO THE SOCIÉTÉ ANONYME DES AUTOMOBILES DELAUNAY-BELLEVILLE, OF ST.-DENIS, FRANCE, A CORPORATION OF FRANCE.

POWER-TRANSMISSION MECHANISM.

1,026,498.  Specification of Letters Patent.  Patented May 14, 1912.

Application filed March 27, 1911.  Serial No. 617,166.

*To all whom it may concern:*

Be it known that I, LOUIS MARIE GABRIEL DELAUNAY-BELLEVILLE, citizen of the French Republic, residing at St.-Denis, Department of the Seine, in France, have invented certain new and useful Improvements in and Relating to Power-Transmission Mechanism; and I do hereby declare the following to be a full, clear, and exact description of the invention, such as will enable others skilled in the art to which it appertains to make and use the same.

This invention relates to transmission mechanism and is especially applicable in cases where it is desired to transmit a power of any magnitude at variable speeds by the employment of hydraulic change speed gear. In such cases it is advantageous where the desired speed is to equal that of the driving shaft not to utilize this intermediary, but on the contrary to couple up the driving shaft directly with the driven shaft in such a manner as to avoid the loss of power due to the absorption of power by the gear.

The invention hereinafter described has for its object realization of this condition.

Figure 1:
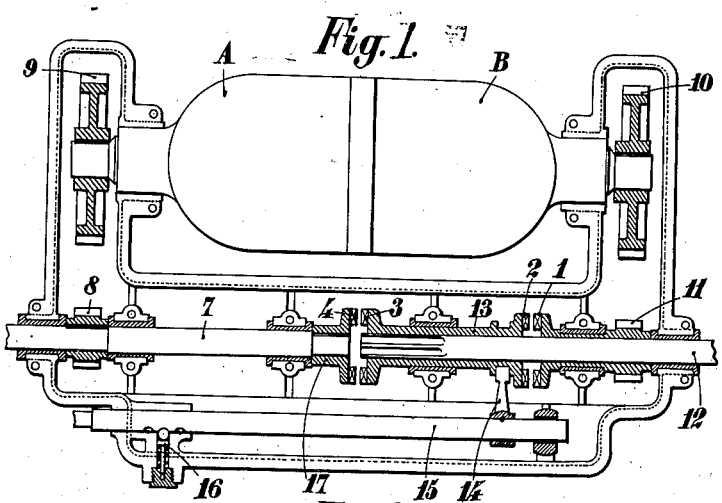
Figure 2:
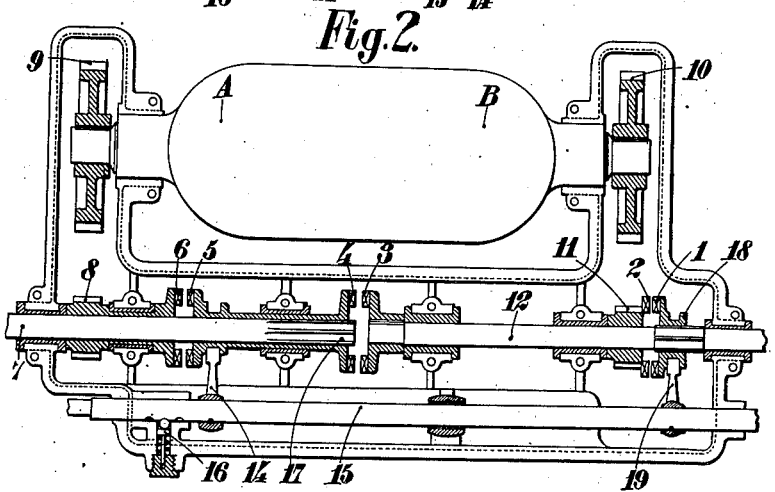
Figure 3:
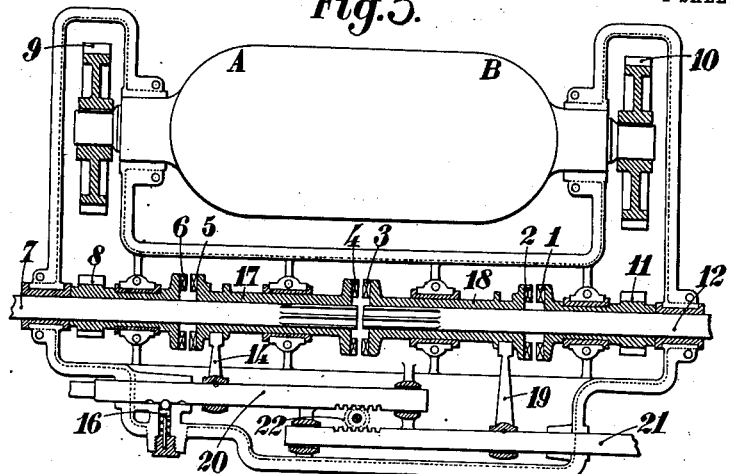
Figure 4:
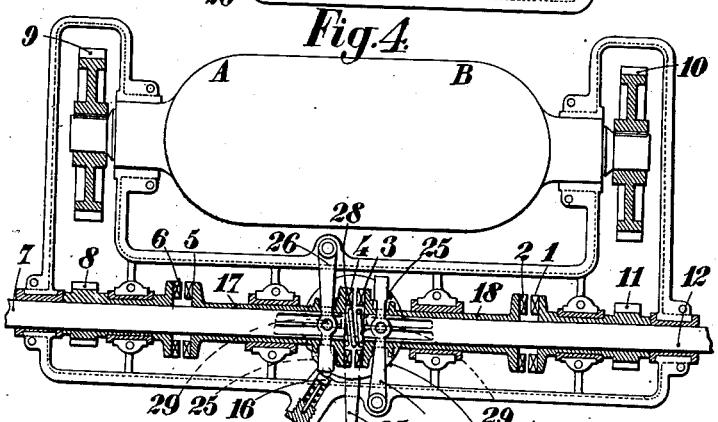
Figure 5:
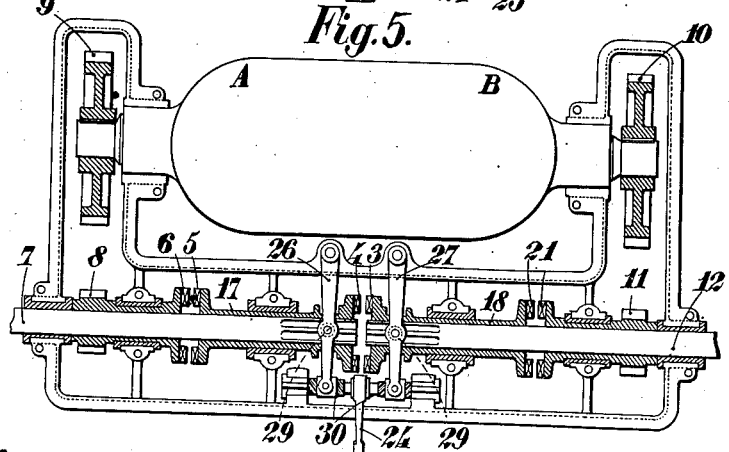

The invention is illustrated in the accompanying drawings in which: Figure 1 is a side elevation of a hydraulic power transmission mechanism embodying the invention, Fig. 2 is a similar view showing a different manner of connecting the pumps between the independent shafts, Fig. 3 shows a different arrangement of sleeves and clutches for connecting in said pumps, Fig. 4 is a view similar to Fig. 3 but provided with a modified form of clutch operating mechanism, and Fig. 5 shows still a different method of operating the sleeves and clutches.

One embodiment of the invention is applicable to cases where the main motor rotates at a different speed to that which it is desired to impart to the hydraulic apparatus; it is represented in Fig. 1 and is constituted as follows: The hydraulic change speed gear consists as in the first case of two gear cases A and B inclosing the variable delivery pump and the constant delivery pump respectively and these two gear cases are connected one with the other by means of a distributing plate thereby placing the suction and delivery orifices of the pumps in communication. Upon the driving shaft 7 there is keyed a pinion 8 which drives the wheel 9 rigid with the primary shaft of the change speed gear. Upon the secondary shaft of this gear there is keyed a wheel 10 for driving the pinion 11 which is loose upon the driven shaft 12. The pinions 8 and 11 and the wheels 9 and 10 have the same number of teeth respectively. The pinion 11 carries clutch 1 at one of its ends. Upon the shaft 12 there is mounted a sleeve 13 provided with clutches 2 and 3 at its ends, said sleeve being able to slide upon the shaft 12 while participating in the rotation of the said shaft. A fork 14 keyed upon the shaft 15 controls the displacement of the sleeve 13; the travel of the shaft 15 is limited in both directions by a ball or roller plunger 16. A sleeve 17 provided with driving teeth 4 is keyed at the extremity of the driving shaft 7.

The operation of this device is as follows: With the parts occupying the position represented in Fig. 1 the gear is on the dead center, the driven shaft 12 being disconnected from the driving shaft 7 and also from the pinion 11. If the sleeve 13 be moved to the right by means of the fork 14 so as to cause the teeth of the clutch 2 to mesh with the teeth of the clutch 1 integral with the pinion 11 the shaft 12 is rendered solid with this pinion 11 and is consequently able to rotate at variable speeds corresponding to the speeds of the driven shaft of the change speed gear. If on the other hand the sleeve 13 be moved to the left so as to cause the teeth 3 to mesh with the teeth 4 of the sleeve 17 the two shafts 7 and 12 will be coupled directly and the driven shaft will therefore rotate at the same speed as the driving shaft without the intermediary of the change speed gear.

Figs. 2, 3, 4 and 5 illustrate modifications of the device represented in Fig. 1.

The device illustrated in Fig. 2 fulfils the same purpose as that shown in Fig. 1 with this difference that when the drive is being directly transmitted the change speed gear will receive no movement from the driving shaft in view of the fact that the pinions 8 and 11 are loose upon the shafts 7 and 12. The driving and the driven shafts 7 and 12 are coupled directly by the teeth 3 and 4 which are caused to engage by the displacement of the sleeve 17 controlled by the fork 14 keyed to the shaft 15. In order to transmit the power at variable speeds the driving teeth of clutches 1 and 2 on the one hand, and the teeth of clutches 5 and 6 on the other hand are caused to engage by shifting the sleeves 17 and 18 by means of the forks 14 and 19.

Fig. 3 represents a device which fulfils exactly the same conditions as that illustrated in Fig. 2. Only the control of the two clutch sleeves 17 and 18 differs. The displacement of these two sleeves, which must be in opposite directions, is obtained by means of two rods 20 and 21 upon which the operating forks 14 and 19 for operating these sleeves are keyed. One of these rods is controlled and by the intermediary of a pinion 22 transmits its movement in the opposite direction to the second rod. The control can thus be exerted solely upon the pinion 22 which transmits it simultaneously to the two rods. By engaging the teeth of clutches 1 and 2 on the one hand and the teeth of clutches 5 and 6 on the other hand, the pinions 11 and 8 are rendered fixed to the shafts 12 and 7 respectively, and the power is transmitted by the intermediary of the hydraulic change speed gear. On the other hand, by engaging the teeth 3 and 4 only the pinions 11 and 8 are released upon their shafts and the latter are coupled directly one with the other without any intermediary.

The principle of the device illustrated in Fig. 4 is similar to the foregoing except as regards the control of the two sleeves 17 and 18 carrying the driving clutches. This control is obtained by the rotation of a plate 23 operated by the lever 24. Upon this plate there are fixed two fingers 25 which cause the levers 26 and 27 to turn about their pivot when the plate 23 is given a movement of rotation. The fingers 29 fixed to these levers are engaged in the groove presented by the sleeves 17 and 18 and impart to the latter a displacement upon their shaft which engages the driving teeth. A spring 28 arranged between the two sleeves returns them to their initial position.

The arrangement illustrated in Fig. 5 is analogous to the foregoing; the displacement of the levers 26 and 27 is obtained by means of a screw 30 having two threads of large pitch opposite in direction controlled by the lever 24.

I claim:

1. A hydraulic power transmission mechanism comprising a pump casing, driving and driven pumps coöperating in said casing, individual shafts normally independent of said pumps, mechanism whereby said shafts can be connected through said pumps, and mechanism whereby said shafts can be directly coupled.

2. A hydraulic power transmission mechanism comprising a pump casing, driving and driven pumps coöperating in said casing, individual shafts normally independent of said pumps, loose sleeves carried by said shafts, and means to make said sleeves rigid with said shafts thereby connecting said shafts through said pumps.

3. A hydraulic power transmission mechanism comprising a pump casing, driving and driven pumps in said casing, a driving shaft independent of said pumps and adapted to be connected with the driving pump, a driven shaft also independent of said pumps and adapted to be connected to said driven pump, and means to couple said shafts to form a unitary shaft independent of said pumps.

4. A hydraulic power transmission mechanism comprising a pump casing, driving and driven pumps in said casing, a driving shaft independent of said pumps, a sleeve loosely mounted on said shaft adapted to operate the driving pump when rigid with said shaft, a clutch carried by said shaft adapted to engage said sleeve to connect the same rigidly with the shaft, a second shaft independent of said pumps provided with a sleeve adapted to be operated by the driven pump, a clutch member carried by said shaft adapted to engage the sleeve so that the driven pump will rotate said second shaft, and means whereby the said shafts can be coupled directly to produce a unitary revolving shaft.

5. In a hydraulic power transmission mechanism, a driving pump, a driven pump, independent individual shafts, and a mechanism adapted when in one position to connect said shafts through said pumps, and when in the other position to connect the shafts directly.

In testimony whereof I affix my signature, in presence of two witnesses.

LOUIS MARIE GABRIEL
DELAUNAY-BELLEVILLE.

Witnesses:
FOSTER DURKEE,
HARRY A. LYONS.